ём

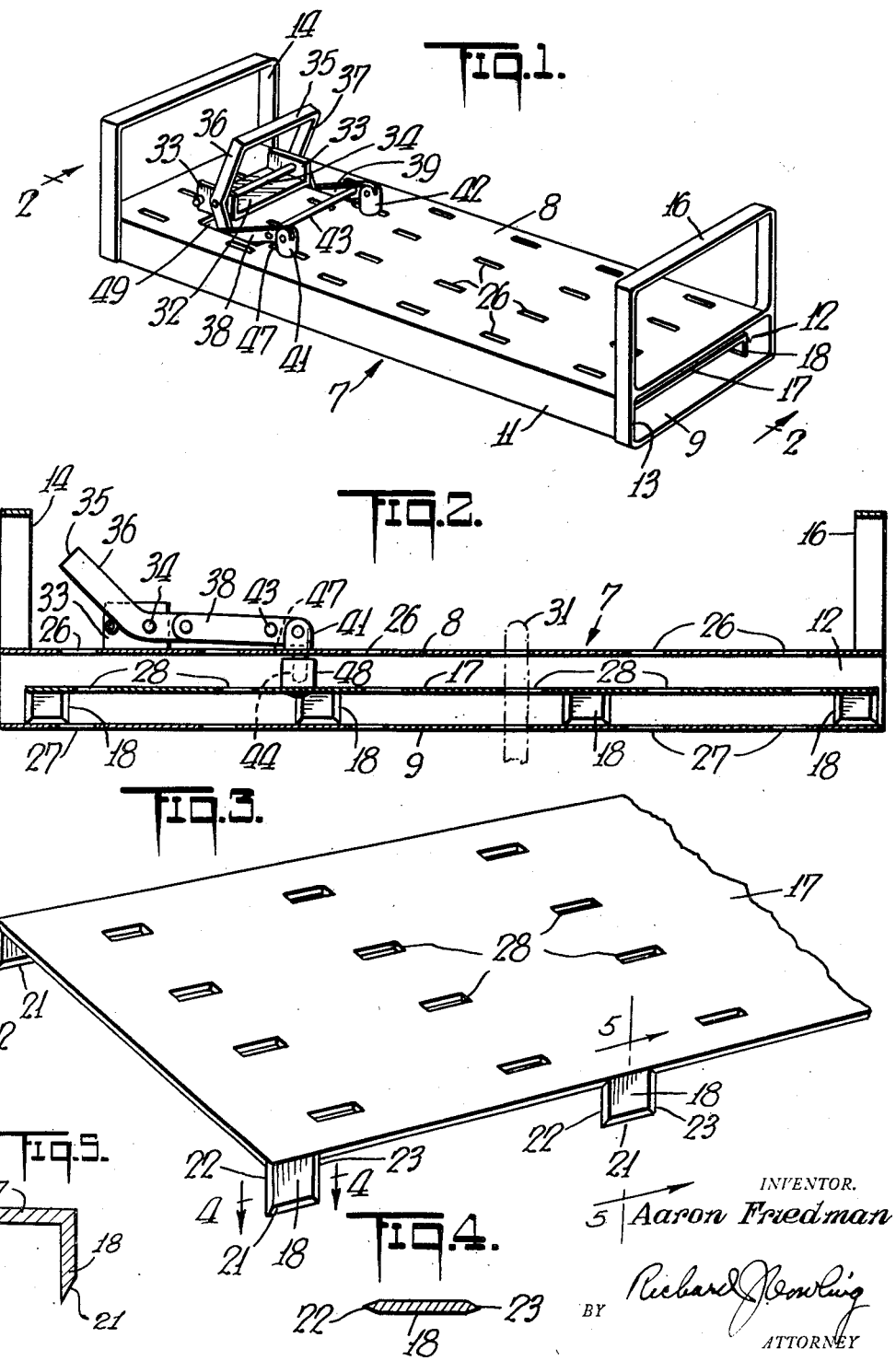

United States Patent Office 2,778,670
Patented Jan. 22, 1957

2,778,670
STICK HOLDER

Aaron Friedman, New York, N. Y., assignor to Joe Lowe Corporation, New York, N. Y., a corporation of Delaware Application July 31, 1953, Serial No. 371,599

4 Claims. (Cl. 294—87.26)

The present invention relates to stickholders for handling frozen confectionary products, and it has particular relation to improvements in such stickholders which are of the type consisting of a fixed top and bottom plate having a longitudinally movable intermediate plate for locking and releasing the individual handle sticks therein and therefrom.

Stickholders of this type are separable into several parts for cleaning purposes, and two different forms which are widely used in the frozen confection industry are shown in United States Letters Patent No. 2,198,528, issued April 23, 1940, and No. 2,321,632, issued June 15, 1943.

With the recent introduction of automatism and exceedingly large brine tanks, it has been found that such stickholders have a tendency to become frosted to an extent, especially under very humid atmospheric conditions, that it becomes impossible for the automatic devices to release the handle sticks from the stickholder without breaking or damaging its operating handle. When this occurs, the frozen stickholder must be removed manually from the line and allowed to warm up until the frost bond is broken before the confections can be released.

The present invention is directed specifically to overcoming this disadvantage of releasing the handle sticks when the stickholder has become frosted while passing through the brine tank.

An object of the invention is to provide a movable intermediate locking plate with a minimum of contacting surface whereby no serious frost bond can be formed that cannot be broken by movement of the operating handle under normal operating pressures.

A further object of the invention is to provide said movable intermediate locking plate with a series of longitudinally spaced legs or feet having sharp knife-like cutting edges which are capable of cutting through frost formations between said legs and the upper surface of the fixed lower plate of said stickholder.

Other and further objects and advantages of the invention reside in the detailed construction of the stickholder, which result in simplicity, economy and efficiency, and which will be apparent from the following description, wherein a preferred embodiment of the invention is shown, reference being had to the accompanying drawings, forming a part hereof, wherein like numerals indicate like parts, in which:

Figure 1 is a perspective view of an assembled stickholder, in its open or stick receiving position, embodying the principles of my invention;

Fig. 2 is an enlarged longitudinal sectional view of the stickholder shown in Figure 1, the same having been taken substantially along the line 2—2 thereof, looking in the direction of the arrows, but showing the stickholder in its forward or stick locking position;

Figure 3 is a further enlarged fragmentary perspective view of the intermediate or movable plate member of the stickholder shown in Figure 1, which better illustrates the novel features of the invention;

Figure 4 is a cross-sectional view of one of the legs of the intermediate movable plate shown in Figure 3, the same having been taken substantially along the line 4—4 thereof, looking in the direction of the arrows; and Figure 5 is a cross-sectional view taken substantially along the line 5—5 of Figure 3, looking in the direction of the arrows.

Referring now to the drawings, there is shown a stickholder 7 consisting of an elongated frame structure of an integral construction, which is generally rectangular in shape, said frame structure consisting of vertically spaced top and bottom plate members 8 and 9, having connecting sidewalls 11 and 12, forming a hollow interior channel 13, which is open at opposite ends and is adapted to receive slidably an intermediate releasing and locking plate member hereinafter to be described. The interior corners of this integral hollow frame structure 7 are rounded, as best shown in Figure 1, to provide interconnecting curved or rounded surfaces to facilitate cleaning. Fixed handles 14 and 16 are welded or otherwise secured to the frame structure 7 and extend upwardly of the top plate member 8 adjacent opposite ends to provide suitable means for manipulating the stickholder between operations.

The hollow interior channel 13 of the main frame structure 7 is adapted to receive an intermediate plate 17, which is adapted to serve as a releasing and locking plate member for the handle sticks, as will hereinafter be more fully described. The locking and releasing plate 17 is of a size slightly smaller than either the top or bottom fixed plates 8 and 9 in order to be movable slidably within the hollow channel 13 of said main frame structure 7. The plate 17 is provided along opposite sides with a series of longitudinally spaced and integrally formed depending feet or legs 18. The feet or legs 18 extend longitudinally of the intermediate plate, having a length substantially half the height of the hollow channel 13, and having a width equal to the thickness of the metal from which said intermediate plate was formed. Each is provided along its bottom 21 and side edges 22 and 23 with an oppositely beveled knife blade edge, which is best shown in Figures 3 and 4.

The fixed top and bottom plates 8 and 9 are each provided with a plurality of similarly spaced stick receiving apertures 26 and 27, respectively, arranged in longitudinal and transverse rows. While the arrangement shown in the drawings is conventional, it is to be understood that any desirable arrangement for the apertures may be employed. The apertures 26 and 27 are shown to be of substantially rectangular shape, but it is obvious that any other suitable shape may be used, if desired. The apertures 26 of the top plate 8 are aligned vertically with the apertures 27 of the bottom plate 9.

The intermediate locking and releasing plate 17 is also provided with a plurality of corresponding apertures 28 of the same size and shape as the apertures 26 and 27 of the top and bottom plate members 8 and 9. The apertures 28 of the intermediate plate 17 are similarly arranged and spaced so that in its open or stick receiving position the apertures 26, 27 and 28 of the three plate members 8, 9 and 17, respectively, may be aligned vertically for the reception and discharge of the handle sticks, one of which is shown in dotted lines in Figure 2, as indicated by the numeral 31.

When the aligned apertures 26, 27 and 28 are loaded or filled with handle sticks, the locking plate 17 is actuated longitudinally of the hollow channel 13 so that its apertures 28 are moved out of substantial vertical registry with the fixed apertures 26 and 27, as best shown in Figure 2, and the handle sticks 31 are wedgedly held between the fixed top and bottom plates 8 and 9 and the movable or slidable intermediate plate 17. The forward ends of the slots 26 and 27 (which are the right hand ends thereof as depicted in the drawings) serve to align the handle sticks 31 vertically of the stickholder frame structure 7. The amount of locking movement of the intermediate plate 17 will be determined by the width of the handle sticks 31 in relation to the length of the apertures 26 and 27. The handle sticks 31 are made of substantially uniform width within a very limited tolerance so that all of the individual sticks positioned in the stickholder will be wedgingly locked therein when the intermediate plate 17 is moved into its locking position. Upon the return movement of the locking plate 17 to its normal releasing or loading position, the same moves to the left and away from the handle sticks and into a position where its apertures 28 are again aligned vertically with the apertures 26 and 27 of the top and bottom plates in which position the sticks 31 will fall freely from the stickholder 7.

The present invention is not concerned with the form of actuating means utilized to move the intermediate plate 17 with respect of the fixed top and bottom plates 8 and 9. Either of the constructions shown and described in the aforementioned Letters Patent, or any other, may be employed.

For the purpose of illustrating an operable stickholder, the actuating means depicted is that shown and described in United States Letters Patent No. 2,198,528, aforementioned, and consists of a U-shaped bracket member 32 mounted on the upper side of the top plate member 8 adjacent one end thereof with its legs 33 extending upwardly. A pintle 34 extends between the legs 33 of the bracket 32 and provides a mounting for a U-shaped handle 35, the legs 36 and 37 of which are angled to provide bell cranks. The free end of each of the handle legs 36 and 37 are connected pivotally to one end of links 38 and 39, and the other ends thereof are secured flexibly to clevis elements 41 and 42. The links 38 and 39 are held in spaced relation by a cross rod 43, whereby the free ends of said links are movable in unison.

The clevis elements 41 and 42 carry downwardly extending posts 44, which extend through suitable elongated apertures 47 in the top plate 8 for engagement in spaced upwardly opening sockets provided in a block 48 secured to the upper face of the locking plate 17 and extending transversely thereof. It will be noted that the posts 44 seat loosely in the sockets of the block 48, whereby said posts may be raised therefrom when and if desired. The top plate 8 is further provided with clearance openings 49 to permit the free end of the handle legs 36 and 37 and links 38 and 39 to swing to a position therebelow.

The operation of the stickholder 7 is well understood in the frozen confection industry so that very little explanation of its operation will be required herein for an understanding of the present invention. When the stickholders 7 are loaded with handle sticks 31, which have been locked in position, they are placed over a multicavity mold (not shown) having a plurality of spaced depending cavities so arranged that either one or two of the depending handle sticks will be submerged into the material held by each cavity to be frozen. The mold and its superposed stickholder 7 are then passed through a conventional brine tank until the contents of the mold cavities are frozen onto the depending and submerged ends of the handle sticks. The freezing operation takes generally from 12 to 30 minutes, depending upon the temperatures of the brine, the apparatus and material to be frozen. Frequently, and especially in tanks requiring a longer freezing period during very humid weather, frost forms on the stickholder 7 to such an extent that the intermediate movable locking or releasing plate 17 becomes frozen to the upper surface of the bottom plate 9. The frost becomes so thick and the bond so strong that the locking handle 35 of the stickholder 7, upon leaving the brine tank and after the defrosting operation, cannot be moved without danger of either damaging the automatic equipment used to move the stickholder along its path or the stickholder, per se. In such an event, the stickholder must be manually removed from its circuitous path and set aside until the frost has melted sufficiently to permit releasing of the handle sticks, which results in a considerable loss of production in an automatic operation.

It has been found that, if the intermediate plate 17 is provided with a limited number of legs or feet 18, which, in turn, are provided with beveled knife-like edges, there is no danger of the stickholder 7 frosting up to an extent where it is impossible to release the handle sticks by normal automatic or manual operations of the manipulating handle 35. The legs or feet 18 reduce materially the area of contact of the intermediate plate 17 with the lower fixed plate 9, and the knife-like edges of said feet 18 cut readily through any formations of frost that have formed on the top surface of the lower plate, thereby facilitating operation of the releasing means.

Although I have only described in detail one embodiment of the invention, it will be readily apparent to those skilled in the art that many further modifications may be made therein without departing from the spirit thereof or from the scope of the appended claims.

What I claim is:

1. In a portable carrier consisting of a frame structure having apertured top and bottom fixed plates and manipulating means carried by one of said plates for moving an intermediate plate having similarly spaced apertures therethrough adapted to be mounted therebetween, the combination of an intermediate plate adapted to be connected with said manipulating means and having a plurality of longitudinally spaced depending legs along each side for engaging the top surface of said bottom plate and holding the same in spaced relation therewith, said legs having their length extending longitudinally of said intermediate plate and having a width equal to the thickness of the metal from which said intermediate plate was formed.

2. In a portable carrier consisting of a frame structure having apertured top and bottom fixed plates and manipulating means carried by the top plate for moving an intermediate plate having similarly spaced apertures therethrough adapted to be mounted removably therebetween, the combination of an intermediate plate adapted to be connected with said manipulating means and having a plurality of spaced depending feet for engaging the top surface of said bottom plate for holding the same in spaced relation therewith, said feet having a knife-like bottom edge for cutting any frost formations on the top surface of said bottom plate.

3. In a portable carrier consisting of a frame structure having apertured top and bottom fixed plates and manipulating means carried by the top plate for moving an intermediate plate having similarly spaced apertures therethrough adapted to be mounted removably therebetween, the combination of an intermediate plate adapted to be connected with said manipulating means and having a plurality of spaced depending legs for engaging the top surface of said bottom plate for holding the same in spaced relation therewith, said legs having knife-like edges along their sides and bottoms for cutting through any frost formations on the top surface of said bottom plate.

4. In a portable carrier consisting of a frame structure having apertured top and bottom fixed plates and manipulating means carried by the top plate for moving an intermediate plate having similarly spaced apertures therethrough adapted to be mounted slidably therebetween, the combination of an intermediate plate adapted to be connected with said manipulating means and having a plurality of spaced depending legs for holding the same in spaced relation therebetween, said legs having oppositely beveled side edges and bottoms forming a knife-like cutting edge for cutting frost formations on the top surface of said bottom plate when said intermediate plate is manipulated by said moving means.

References Cited in the file of this patent

UNITED STATES PATENTS

| | | |
|---|---|---|
| 2,018,252 | Cruickshank | Oct. 22, 1935 |
| 2,253,458 | Cutting | Aug. 19, 1941 |
| 2,377,364 | Overland | June 5, 1945 |
| 2,461,844 | Overland | Feb. 15, 1949 |
| 2,514,942 | Eaton | July 11, 1950 |
| 2,704,928 | Curry | Mar. 29, 1955 |